United States Patent
Puthillathe et al.

(10) Patent No.: US 10,922,162 B2
(45) Date of Patent: Feb. 16, 2021

(54) CAPTURING VIDEO DATA AND SERIAL DATA DURING AN INFORMATION HANDLING SYSTEM FAILURE

(71) Applicant: DELL PRODUCTS, L.P., Round Rock, TX (US)

(72) Inventors: Chandrasekhar Puthillathe, Bangalore (IN); Chitrak Gupta, Bangalore (IN); Rajeshkumar Patel, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 189 days.

(21) Appl. No.: 16/006,972

(22) Filed: Jun. 13, 2018

(65) Prior Publication Data

US 2019/0384666 A1    Dec. 19, 2019

(51) Int. Cl.
| | |
|---|---|
| *G06F 11/00* | (2006.01) |
| *G06F 11/07* | (2006.01) |
| *G06T 1/60* | (2006.01) |
| *G06T 1/20* | (2006.01) |

(52) U.S. Cl.
CPC ...... *G06F 11/0787* (2013.01); *G06F 11/0751* (2013.01); *G06F 11/0775* (2013.01); *G06T 1/20* (2013.01); *G06T 1/60* (2013.01)

(58) Field of Classification Search
CPC .......................... G06F 11/0778; G06F 11/0787
See application file for complete search history.

(56) References Cited

U.S. PATENT DOCUMENTS

| | | |
|---|---|---|
| 9,753,809 B2 | 9/2017 | Antony |
| 2008/0133968 A1 | 6/2008 | Muppirala et al. |
| 2011/0314343 A1* | 12/2011 | Hoke .................. G06F 11/3672 714/45 |
| 2012/0102373 A1* | 4/2012 | Waugh ................ G06F 11/0778 714/57 |
| 2015/0372884 A1* | 12/2015 | Baldwin ............. G06F 11/3006 709/224 |
| 2016/0314047 A1 | 10/2016 | Goel |
| 2016/0371149 A1* | 12/2016 | Antony ............... G06F 11/1451 |
| 2017/0300371 A1* | 10/2017 | Soffer ................ G06F 11/0709 |
| 2019/0205042 A1* | 7/2019 | Kandula ............ G06F 11/1402 |

OTHER PUBLICATIONS

NPL: Google Scholar/Patents search (Year: 2020).*

* cited by examiner

*Primary Examiner* — Christopher S McCarthy
(74) *Attorney, Agent, or Firm* — Isidore PLLC

(57) ABSTRACT

A method, an information handling system (IHS), and a system for capturing video data and serial data during an IHS failure. The method includes detecting, via a controller, an occurrence of a system event log (SEL) incident in the IHS. In response to detecting the occurrence of the SEL incident in the IHS, a data recording window is retrieved from a volatile controller memory. The data recording window contains video data and serial data for a time period up to a time of detection of the SEL incident. The method further includes storing the data recording window including the video data and the serial data for the time period to a non-volatile controller memory.

17 Claims, 7 Drawing Sheets

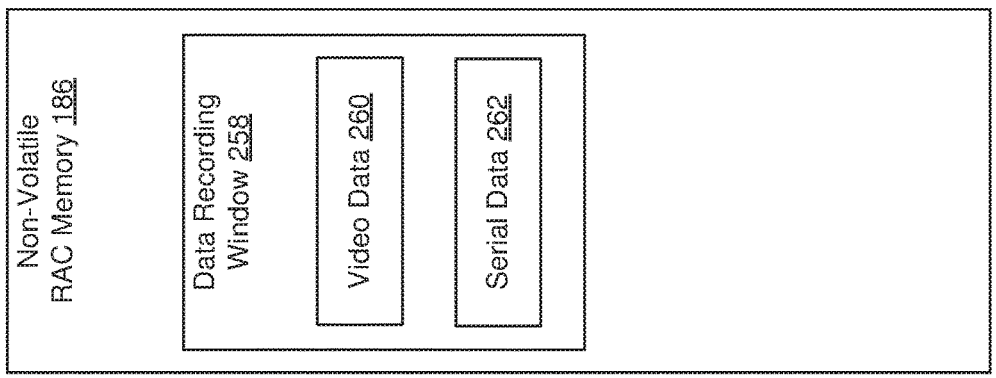
FIG. 2E
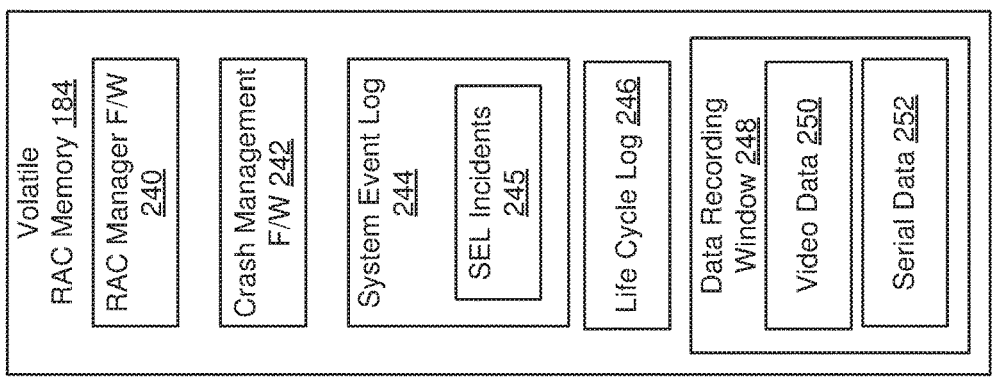
FIG. 2D
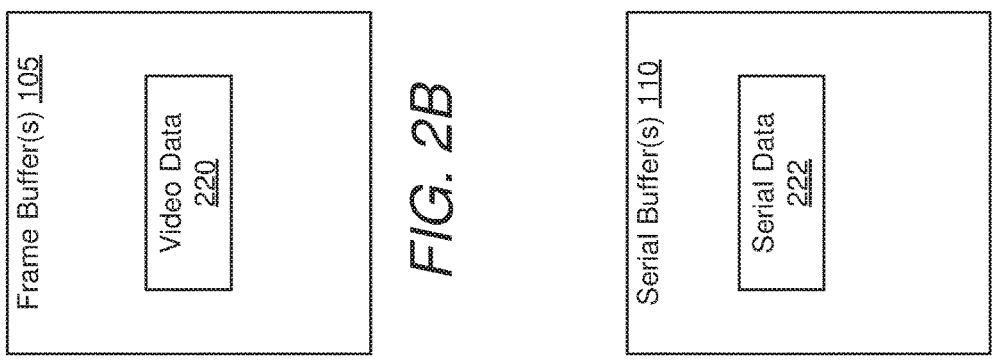
FIG. 2B
FIG. 2C
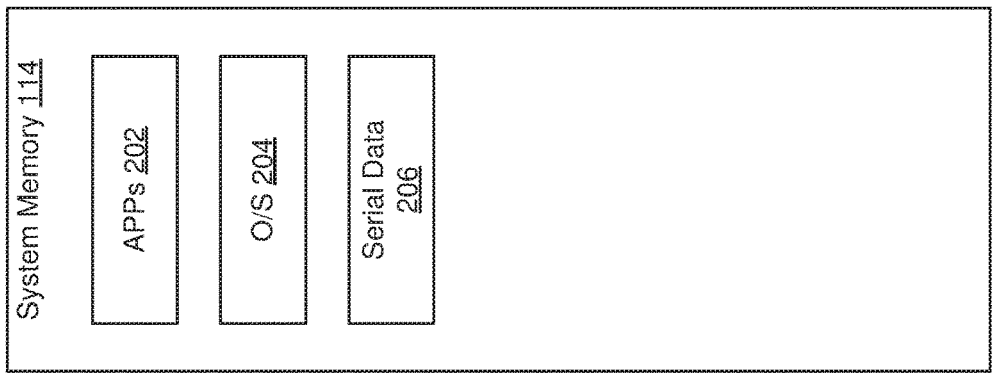
FIG. 2A

FIG. 4A

Bug Check/Blue Screen – OS stop event record typical characteristics

| Byte | Field | Description |
|---|---|---|
| 8, 9 | Generator ID | 0041h – System Software with an ID = 20h |
| 11 | Sensor Type | 20h = OS Stop/Shutdown |
| 12 | Sensor Number | 00h |
| 13 | Event Direction and Event Type | [7] Event direction<br>  0b = Assertion Event<br>  1b = Deassertion Event<br>[6:0] Event Type = 6Fh (Sensor Specific) |
| 14 | Event Data 1 | [7:4] – 00b = Unspecified Event Data 2<br>[5:4] – 00b = Unspecified Event Data 3<br>[3:0] – Event Trigger Offset = 1h = Runtime Critical Stop (that is, "core dump", "blue screen") |
| 15 | Event Data 2 | Not used |
| 16 | Event Data 3 | Not used |

400

**Linux* kernel panic event record characteristics**

| Byte | Field | Description |
|---|---|---|
| 8, 9 | Generator ID | 0021h – Kernel |
| 10 | EvM Rev | 03h = IPMI 1.0 format |
| 11 | Sensor Type | 20h = OS Stop/Shutdown |
| 12 | Sensor Number | The first byte of the panic string (0 if no panic string) |
| 13 | Event Direction and Event Type | [7] Event direction<br>0b = Assertion Event<br>1b = Deassertion Event<br>[6:0] Event Type = 6Fh (Sensor Specific) |
| 14 | Event Data 1 | [7:6] – 10b = OEM code in Event Data 2<br>[5:4] – 10b = OEM code in Event Data 3<br>[3:0] – Event Trigger Offset = 1h = Runtime Critical Stop (a.k.a. "core dump", "blue screen") |
| 15 | Event Data 2 | The second byte of the panic string |
| 16 | Event Data 3 | The third byte of the panic string |

CAPTURING VIDEO DATA AND SERIAL DATA DURING AN INFORMATION HANDLING SYSTEM FAILURE

BACKGROUND

1. Technical Field

The present disclosure generally relates to information handling systems and in particular to capturing video data and serial data during an information handling system failure.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

An information handling system can experience errors or unexpected events that cause a crash or failure of the information handling system. System errors can occur due to a variety of reason, such as device driver conflicts, program crashes, data errors from viruses, hardware device failures, incorrect memory access, and other reasons. When a system failure occurs in a Windows operating system, a "blue screen" may be displayed on a system monitor or display. When a system failure occurs in a non-Windows operating system, a "kernel panic" can occur resulting in a screen freeze. The blue screen is an error screen displayed on a computer monitor, indicating the occurrence of a fatal system error or system crash. Typically, the blue screen disappears and is not recoverable following a system crash.

BRIEF SUMMARY

Disclosed are a method, an information handling system (IHS), and a system for capturing video data and serial data during an IHS failure.

According to one embodiment, the method includes detecting, via a controller, an occurrence of a system event log (SEL) incident in the IHS. In response to detecting the occurrence of the SEL incident in the IHS, a data recording window is retrieved from a volatile controller memory. The data recording window contains video data and serial data for a time period up to a time of detection of the SEL incident. The method further includes storing the data recording window including the video data and the serial data to a non-volatile controller memory.

According to another embodiment, the IHS includes a processor communicatively coupled to a controller. The controller is communicatively coupled to a volatile controller memory and a non-volatile controller memory. The controller has firmware executing thereon that enables capturing of a screenshot during a failure of the IHS. The firmware configures the controller to detect an occurrence of a system event log (SEL) incident in the IHS. In response to detecting the occurrence of the SEL incident in the IHS, a data recording window is retrieved from the volatile controller memory. The data recording window contains video data and serial data for a time period up to a time of detection of the SEL incident. The controller stores the data recording window including the video data and the serial data to the non-volatile controller memory.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2A illustrates example contents of a system memory in an IHS, in accordance with one embodiment;

FIG. 2B illustrates example contents of a frame buffer during operation of an IHS, in accordance with one embodiment;

FIG. 2C illustrates example contents of a serial buffer during operation of an IHS, in accordance with one embodiment;

FIG. 2D illustrates example contents of a volatile remote access controller memory, in accordance with one embodiment;

FIG. 2E illustrates example contents of a non-volatile remote access controller memory, captured during an IHS failure, that can be used to correct problems in the IHS, in accordance with one embodiment;

FIG. 4A illustrates an example system event log (SEL) record, in accordance with one embodiment;

FIG. 4B illustrates another SEL record, in accordance with one embodiment;

DETAILED DESCRIPTION

Figure 1:
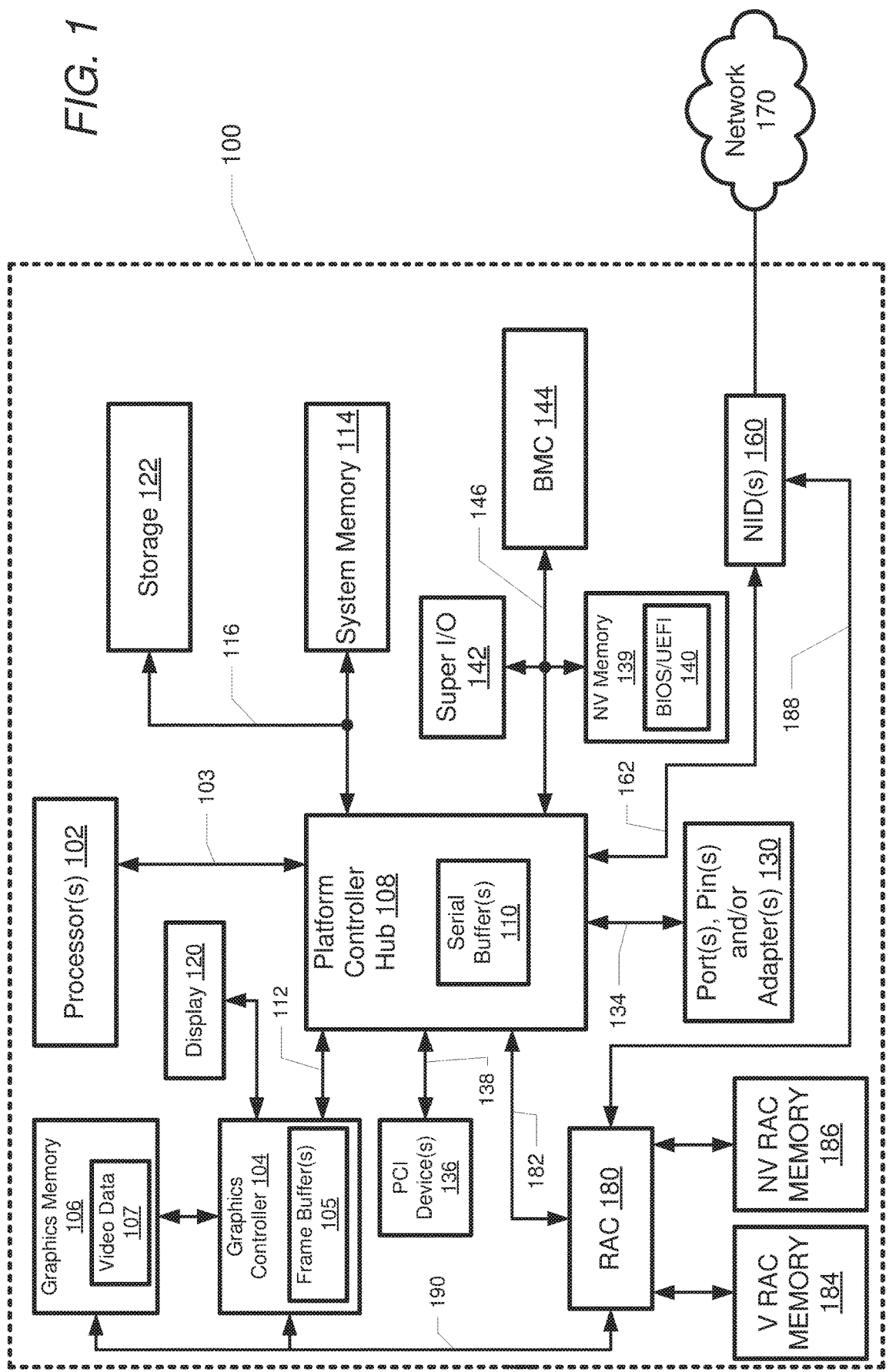
FIG. 1 illustrates one example of an IHS within which various aspects of the disclosure can be implemented, according to one or more embodiments.

The illustrative embodiments provide a method, an information handling system (IHS), and a system for capturing video data and serial data during an information handling system (IHS) failure.

The method includes detecting, via a controller, an occurrence of a system event log (SEL) incident in the IHS. In response to detecting the occurrence of the SEL incident in the IHS, a data recording window is retrieved from a volatile controller memory. The data recording window contains video data and serial data for a time period up to a time of detection of the SEL incident. The method further includes storing the data recording window including the video data and the serial data for the time period to a non-volatile controller memory.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS, IHS 100, is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions.

Processor(s) 102 are coupled to platform controller hub (PCH) or chipset 108 via front-side bus 103. PCH 108 may be configured to coordinate I/O traffic between processor(s) 102 and other components. For example, in this particular implementation, PCH 108 is coupled to various IHS components such as a graphics processing unit (GPU) or graphics controller 104 via graphics bus 112 (e.g., AGP bus, a Peripheral Component Interconnect (PCI) bus, etc.). Graphics controller 104 can render or process video data. Graphics controller 104 is coupled to graphics memory 106 and to a monitor or display 120. In one embodiment, display 120 can be a system administrator display.

Graphics memory 106 can store video frames or video data 107 received from graphics controller 104. Graphics controller 104 includes one or more frame buffers 105. Frame buffers 105 are memory blocks utilized for temporary storage of video data. In one embodiment, frame buffers 105 can contain complete frames of video data for presentation on display 120.

PCH 108 further includes one or more serial buffers 110. Serial buffers 110 are memory blocks utilized for temporary storage of serial data that is being transmitted between PCH 108 and other components of IHS 100. For example, the serial data can contain data associated with device drivers, memory access, and storage access within IHS 100. In one embodiment, PCH 108 can include one or more serial controllers.

PCH 108 is also coupled to system memory 114 via memory bus 116. System memory 114 may be configured to store program instructions and/or data accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

PCH 108 is coupled by memory bus 116 to storage device or storage 122 within which can be stored one or more software and/or firmware modules and/or data (not specifically shown). In one embodiment, storage 122 can be a hard drive or a solid state drive. The one or more software and/or firmware modules within storage 122 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over bus 134. For example, PCH 108 may be configured to allow data to be exchanged between IHS 100 and other devices, such as other IHSs attached to a network (e.g., network 170). In various embodiments, PCH 108 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is coupled to a non-volatile (NV) storage or memory device 139 via Low Pin Count (LPC) bus 146. NV memory 139 stores a basic input output system/unified extensible firmware interface (BIOS/UEFI) 140. PCH 108 is also coupled to super I/O Controller 142 and baseboard management controller (BMC) 144 via LPC bus 146.

BIOS/UEFI 140 includes program instructions stored typically as BIOS or UEFI images. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

IHS 100 further includes a baseboard management controller (BMC) 144 that is in communication with NV memory 139, which can have program instructions stored thereon that are usable by processors(s) 102 to enable remote management of IHS 100. For example, BMC 144 may enable a user to discover, configure, and manage IHS 100, setup configuration options, resolve and administer hardware or software problems, etc. Additionally or alternatively, BMC 144 may include one or more BMC firmware volumes, each volume having one or more firmware files used by the UEFI firmware interface to initialize and test components of IHS 100. IHS 100 also includes a super I/O controller 142 that combines interfaces for a variety of lower bandwidth or low data rate devices. Those devices may include, for example, floppy disks, parallel ports, a keyboard and mouse, and other devices.

In some cases, IHS 100 may be configured to access different types of computer-accessible media or memory/storage devices separate from system memory 114. Generally speaking, a computer-accessible memory/storage device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further includes one or more network interface devices (NID(s)) 160 coupled to PCH 108 via bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component. However, it is appreciated that network 170 can comprise one or more direct connections to other devices as well as a more complex set of interconnections as can exist within a wide area network, such as the Internet.

IHS 100 further includes a remote access controller (RAC) 180 coupled via PCI bus 182 to PCH 108. RAC 180 provides management functions that allow an administrator to deploy, monitor, manage, configure, update, troubleshoot and remediate IHS 100. RAC 180 is also coupled to volatile RAC memory 184 and non-volatile RAC memory 186. In one embodiment, volatile RAC memory 184 is computer memory that maintains its data while the device is powered. In one embodiment, RAC memory 184 can be SRAM or SDRAM memory. Non-volatile RAC memory 186 is computer memory that can retain stored information even after having lost power. Examples of non-volatile RAC memory 186 include flash memory and ferroelectric memory. RAC 180 is communicatively coupled to NID(s) 160 via a sideband bus 188. RAC 180 is also communicatively coupled to graphics controller 104 and to graphics memory 106 via PCI bus 190. In one embodiment, graphics memory 106 can be integrated with or be part of volatile RAC memory 184.

RAC 180 monitors and controls the operation of IHS 100 and other systems and devices communicatively coupled to IHS 100. RAC 180 can also perform configuration and remote control of other connected IHSs. Certain software and/or firmware modules stored in volatile RAC memory 184 and/or non-volatile RAC memory 186 can be executed by RAC 180. Processor(s) 102 and RAC 180 include specific firmware that enables processor(s) 102 and RAC 180 to perform the various functions described herein.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In other implementations, one or more of the devices or components shown in FIG. 1 may be absent, or one or more other components may be added. Accordingly, systems and methods described herein may be implemented or executed with other computer system configurations. In addition, the operations performed by the illustrated components may, in some embodiments, be performed by fewer components or distributed across additional components. Similarly, in other embodiments, the operations of some of the illustrated components may not be performed and/or other additional operations may be available.

In the description of each of the following figures, reference is also made to specific components illustrated within the preceding figures. With reference now to FIG. 2A, one embodiment of example contents of system memory 114 of IHS 100 is shown. System memory 114 includes data, software, and/or firmware modules, including application(s) 202, operating system (O/S) 204, and serial data 206. Serial data 206 is data being transmitted using a serial protocol between processor 102 and PCH 108. For example, serial data 206 can contain data associated with device drivers, memory access, and storage access within IHS 100. System memory 114 can also include other data, software, and/or firmware modules.

Turning to FIG. 2B, one embodiment of example contents of frame buffer(s) 105 of IHS 100 that can be captured during a failure of IHS 100 is shown. Frame buffer(s) 105 include video data 220. Frame buffer(s) 105 can temporarily store video data 220 that is being received, transmitted, or processed by graphics controller 104. In one embodiment, video data 220 can contain complete video frames for presentation on display 120. In an embodiment, the video data is recorded for a time period during a failure of IHS 100.

FIG. 2C illustrates one embodiment of example contents of serial buffer(s) 110 of IHS 100 that can be captured during a failure of IHS 100. Serial buffer(s) 110 include serial data 222. Serial buffer(s) 110 can temporarily store serial data 222 that is being received, transmitted, or processed by PCH 108. In one embodiment, serial data 222 can contain data associated with device drivers, memory access, and storage access within IHS 100. In an embodiment, the serial data is recorded for a time period during a failure of IHS 100.

Turning to FIG. 2D, one embodiment of example contents of volatile RAC memory 184 of IHS 100, at least a portion of which can be captured during a failure of IHS 100, is shown. Volatile RAC memory 184 includes RAC manager F/W 240, crash management F/W 242, system event log (SEL) 244, and life cycle log (LCL) 246. When executed by RAC 180, RAC manager F/W 240 can control and manage the functions and operation of RAC 180. Crash management F/W 242 performs the processes presented in the flowcharts of FIGS. 5 and 6. SEL 244 contains information, data, and records about events, errors, and problems taking place during the operation of IHS 100. Specifically, SEL 244 contains SEL records or incidents 245. SEL 244 uses SEL incidents 245 to provide an audit trail that can be used to understand the activity of the IHS and to diagnose problems. LCL 246 includes data and records about actions performed on IHS 100. For example, LCL 246 can contain information about replaced parts, firmware changes, temperature warnings, and configuration changes to hardware components. LCL 246 can further include timestamps, action severity, and recommended actions.

Volatile RAC memory 184 further includes data recording window 248. Data recording window 248 contains video data 250 and serial data 252 for several time intervals (e.g., multiple time intervals of 30 seconds). The length and number of the time intervals can be pre-determined and/or selected by a user. In one embodiment, data recording window 248 can record video data and serial data for a time period (e.g., for four (4) 30-second time intervals or 2 minutes). The data recording window can be a sliding data window that is continuously updated with new information during the operation of IHS 100. The data recording window can be set to record data for a user selected time period and number of time intervals. Video data 250 can be periodically received from frame buffers 105 and stored to volatile RAC memory 184, and serial data 252 can be periodically received from serial buffers 110 and stored to volatile RAC memory 184.

FIG. 2E illustrates one embodiment of example contents of non-volatile RAC memory 186 of IHS 100. Non-volatile RAC memory 186 includes data recording window 258. Data recording window 258 contains video data 260 and serial data 262. Data recording window 258, which includes video data 260 and serial data 262, is copied from volatile RAC memory 184 during detection of a system crash or failure event, and data recording window 258 is stored to non-volatile RAC memory 186.

Figure 3:
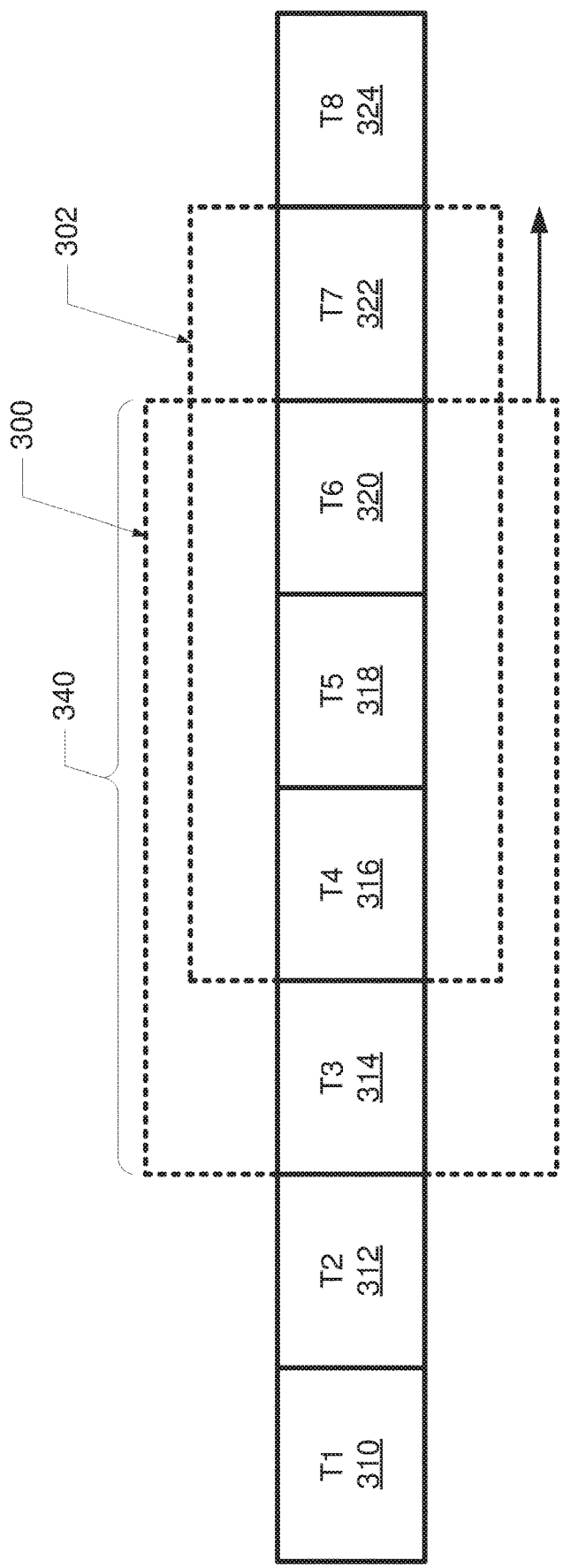
FIG. 3 illustrates an example data recording window, in accordance with one embodiment.

Referring to FIG. 3, an example recording window 300 is shown. IHS 100 can operate over several time intervals including time intervals T1 310, T2 312, T3 314, T4 316, T5 318, T6 320, T7 322 and T8 324. Recording window 300 comprises 4 time intervals T3 314, T4 316, T5 318 and T6 320 that collectively form or make up time period 340. In one embodiment, data recording window 248 can correspond to data recorded during recording window 300 and contain video data and serial data for time intervals T3 314, T4 316, T5 318 and T6 320. In one embodiment, each time interval can be 30 seconds long and a time period can comprise 4 time intervals for a total of 2 minutes. The data recording window 248 can be a sliding data window that is continuously updated with new information during the operation of IHS 100. For example, as the recording window moves to the right over time, data associated with the oldest time interval (i.e., time interval T3 314) can be erased from data recording window 248 and data associated with the new time interval (i.e., time interval T7 322) can be added or stored to the new recording window 302. The data recording window 248 therefore contains video data and serial data associated with the last 2 minutes of operation of IHS 100.

FIG. 4A illustrates one embodiment of an example system event log (SEL) record 400 that would be contained in SEL incident 245 of SEL 244 (FIG. 2D). In an embodiment, the SEL incident 245 can include an operating system (OS) bug check/blue screen event record 400. System event log (SEL) record 400 is a Windows operating system (OS) bug check/blue screen event record. As shown in byte 14, system event log (SEL) record 400 contains information and data about a runtime critical stop or crash event in IHS 100 that is running a Windows OS. SEL record 400 can be used by a system operator to diagnose and correct problems within IHS 100.

FIG. 4B illustrates another embodiment of an example system event log (SEL) incident or record 450 that would be contained in SEL incident 245 of SEL 244 (FIG. 2D). In an embodiment, SEL incident 245 can include a Linux kernel panic record 450. System event log (SEL) record 450 is a Linux OS kernel panic record. As shown in byte 14, system event log (SEL) record 450 contains information and data about a runtime critical stop or crash event in IHS 100 that is running a Linux OS. SEL record 450 can be used by a system operator to diagnose and correct problems within IHS 100.

In one embodiment, RAC 180 detects an occurrence of a system event log (SEL) record or incident 245 in IHS 100. In response to detecting the occurrence of an SEL incident in the IHS, RAC 180 retrieves the data recording window 248 from volatile RAC memory 184 and stores the data recording window 248 containing video data and serial data for the recent time period to non-volatile RAC memory 186 as data recording window 258.

Figure 5:
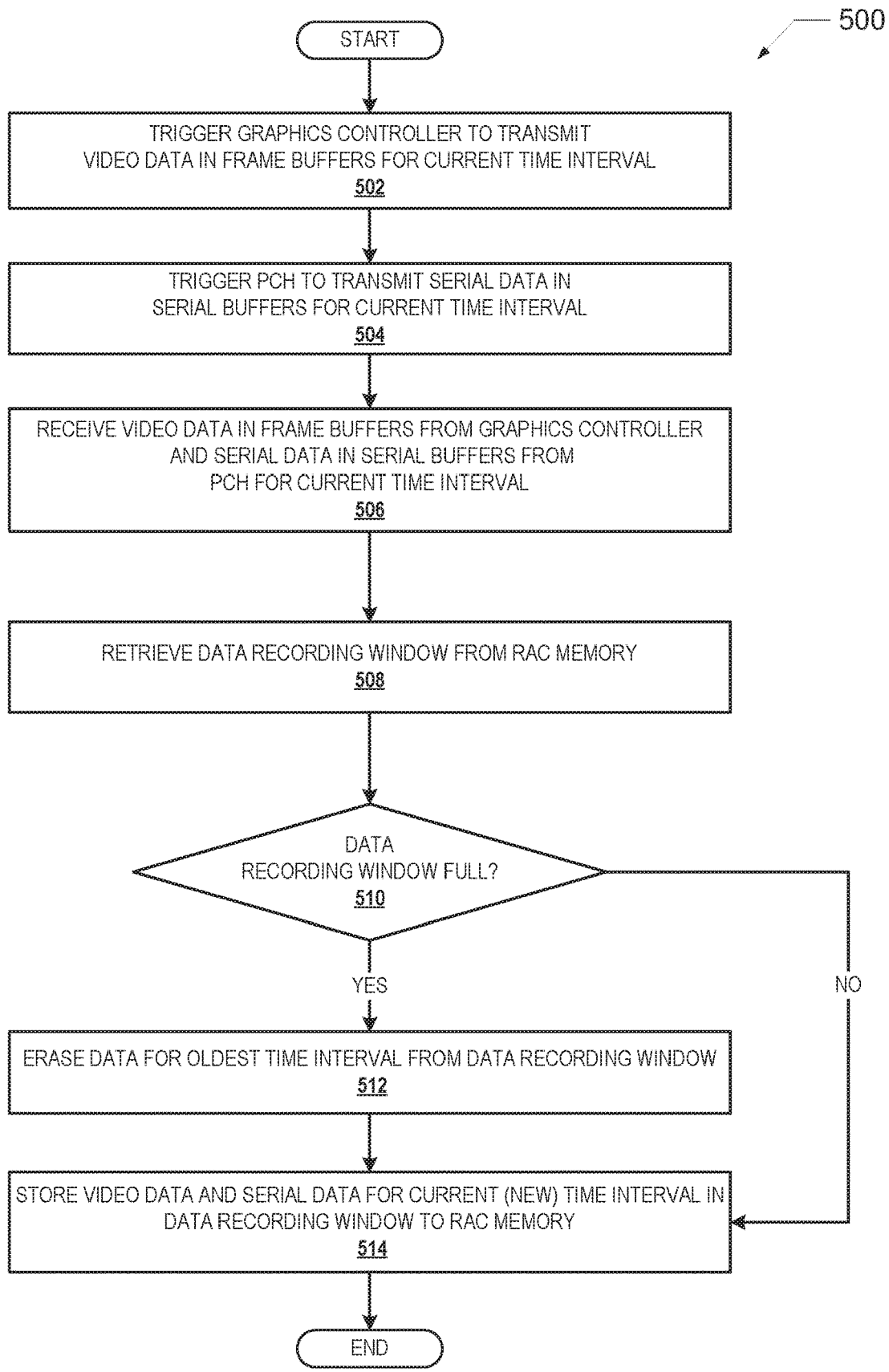
FIG. 5 is a flow chart illustrating one example of a method for storing video data and serial data in a data recording window for a time period, according to one or more embodiments.
Figure 6:
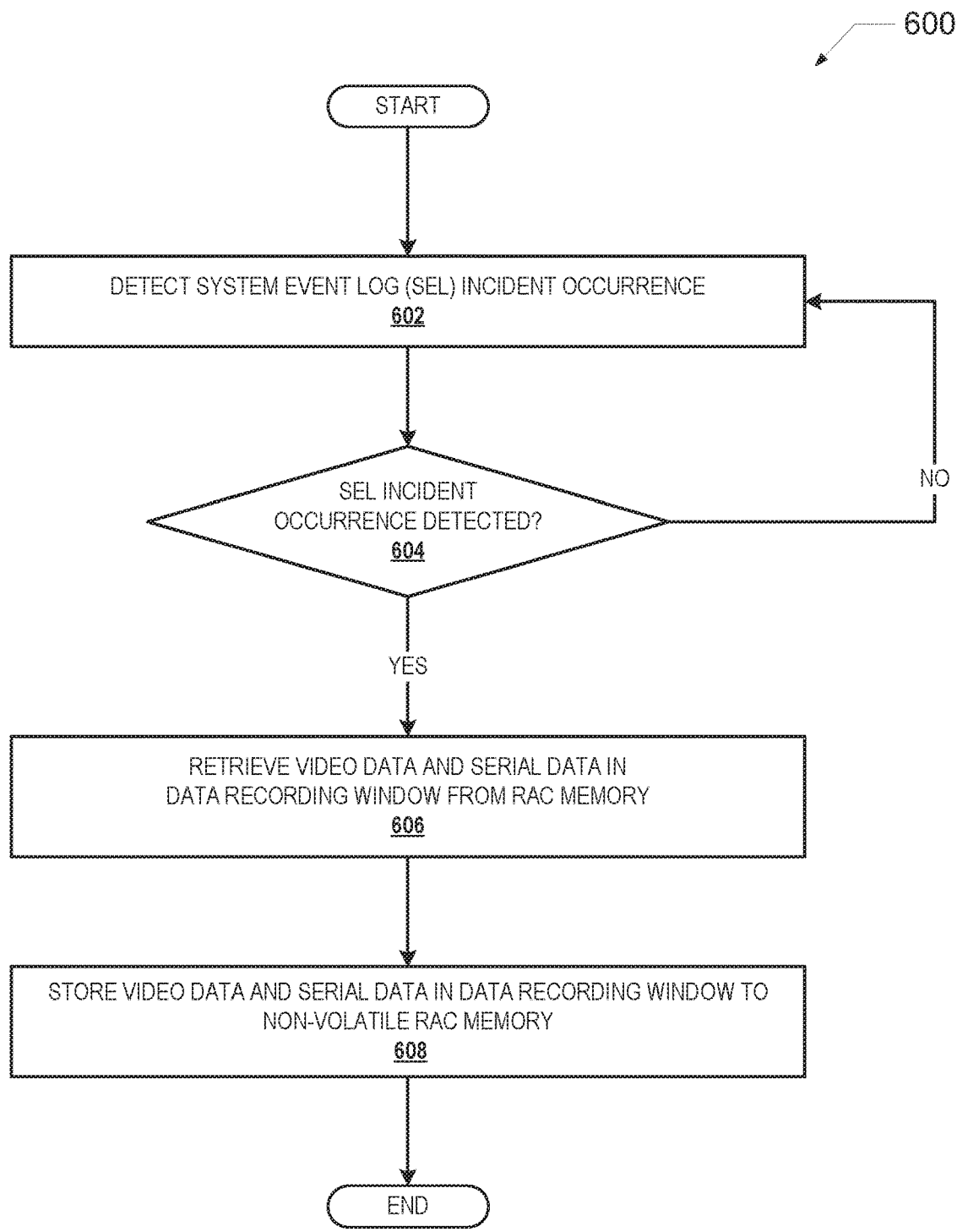
FIG. 6 is a flow chart illustrating one example of a method for capturing a screenshot during a failure of an IHS, according to one or more embodiments.

FIGS. 5 and 6 illustrate flowcharts of exemplary methods 500 and 600 by which RAC 180 within the preceding figures performs different aspects of the processes that enable the one or more embodiments of the disclosure. Generally, method 500 represents a method by which RAC 180 continuously stores video data and serial data in a data recording window for a time period. Method 600 represents a method by which RAC 180 captures a screenshot during a crash or failure of IHS 100.

The description of methods 500 and 600 is provided with general reference to the specific components illustrated within the preceding FIGS. 1-4B. Generally, methods 500 and 600 are described as being implemented via RAC 180 and particularly the execution of code provided by crash management F/W 242 acting within RAC 180. It is however appreciated that certain aspects of the described methods may be implemented via other processing devices and/or execution of other code.

Referring to the flow chart of FIG. 5, method 500 begins at the start block and proceeds to block 502 where RAC 180 triggers graphics controller 104 to transmit video data 220 contained in frame buffer 105 for a current time interval (e.g., time interval T6 320) to RAC 180. RAC 180 triggers PCH 108 to transmit serial data 222 contained in serial buffer 110 for the current time interval (e.g., time interval T6 320) to RAC 180 (block 504). RAC 180 receives video data 220 and serial data 222 for the current time interval (block 506).

RAC 180 retrieves data recording window 248 from volatile RAC memory 184 (block 508). At decision block 510, RAC 180 determines if the data recording window 248 is full (i.e., contains data for the maximum number of time intervals (e.g., 4 time intervals)). The data recording window is full when data for the maximum number of time intervals has been stored in the data recording window. In response to determining that the data recording window is full, RAC 180 erases video data and serial data for the oldest time interval (e.g., time interval T3 314) in data recording window 248 from the volatile RAC memory 184 (block 512).

After block 512 or in response to determining that the data recording window is not full, RAC 180 stores video data 250 and serial data 252 for the current or new time interval (e.g., time interval T6 320) in data recording window 248 to volatile RAC memory 184 (block 514). In one embodiment, video data 250 and serial data 252 are sequentially stored in a fixed size circular buffer. The video data includes multiple video frames which are stored sequentially. When video data 250 and serial data 252 for a new time interval are received, the new video data and serial data are overwritten in place of the oldest video data and serial data. During operation, the video data 250 and serial data 252 can also be tagged with a time stamp. In another embodiment, other metadata can also be stored along with video data 250 and serial data 252. For example, compressed video buffers that include run length encoding to increase storage capacity can be used. Method 500 then terminates.

Referring to the flow chart of FIG. 6, method 600 begins at the start block and proceeds to block 602 where RAC 180 detects an occurrence of a system event log (SEL) record or incident 245 in IHS 100. When a critical error or incident occurs during the operation of IHS 100, processor 102 generates a SEL record and transmits the SEL record to RAC 180 and RAC 180 stores the SEL record to SEL 244. In one embodiment, the SEL record or incident is transmitted using an intelligent platform management interface (IPMI) SEL addition command. RAC 180 can detect the transmission of the IPMI SEL addition command. In an embodiment, SEL incident 245 can include at least one of a Linux kernel panic record 450 and an operating system (OS) bug check/blue screen event record 400.

At decision block 604, RAC 180 determines if an SEL incident (i.e., an IPMI SEL addition command) has been detected. In response to not detecting the occurrence of an SEL incident in the IHS, RAC 180 continues to detect system event log (SEL) records or incidents 245 in IHS 100 (block 602). In response to detecting the occurrence of an SEL incident in the IHS, RAC 180 retrieves the data recording window 248 from volatile RAC memory 184 (block 606). The data recording window 248 contains video data and serial data for the recent time period 340 during which a critical error or incident (i.e., system crash or failure) occurs during the operation of IHS 100.

In one embodiment, the video data can correspond to a screenshot of an error "blue screen", presented on display 120 during a failure of the IHS. The "blue screen" occurs when the OS kernel or a driver running in kernel mode of the OS encounters an unrecoverable error. The only safe action the OS can take in this situation is to restart the computer. As a result, data may be lost, as users are not given an opportunity to save data that has not yet been saved. The text on the "blue screen" contains the code of the error, an associated symbolic name, and error values. Depending on the error code, the "blue screen" can display the address where the problem occurred, along with the driver which is loaded at that address.

RAC 180 stores the data recording window 258 to non-volatile RAC memory 186 (block 608). The data recording window 258 contains video data 260 and serial data 262 for the recent time period 340. Method 600 then ends.

When IHS 100 crashes or fails, data contained in volatile RAC memory 184 can be lost. Video data 260 can correspond to a screenshot of a system administrator display 120, such as an error "blue screen", during a failure of the IHS. The use of non-volatile RAC memory 186 to store video data 260 and serial data 262 for a recent time period when a critical error or incident (i.e., system crash or failure) has occurred prevents the loss of video data 260 and serial data 262 that can be used to fix, repair, and/or correct problems in IHS 100.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for capturing a screenshot during an information handling system (IHS) failure, the method comprising:
   detecting, via a controller, an occurrence of a system event log (SEL) incident in the IHS, wherein the SEL incident comprises an intelligent platform management interface (IPMI) SEL addition command;
   in response to detecting the occurrence of the SEL incident in the IHS, retrieving a data recording window from a volatile controller memory, the data recording window containing video data and serial data recorded for a time period from prior to and up to a time of detection of the SEL incident; and storing the data recording window including the video data and the serial data for the time period to a non-volatile controller memory.

2. The method of claim 1, further comprising:

triggering a graphics controller to transmit, to the controller, video data contained in at least one frame buffer for a first time interval, the time period including a plurality of time intervals;

triggering a platform controller hub (PCH) to transmit, to the controller, serial data contained in at least one serial buffer for the first time interval; and receiving, via the controller, the video data and the serial data for the first time interval.

3. The method of claim 1, wherein the video data corresponds to a screenshot of a display.

4. The method of claim 1, wherein a SEL includes at least one of a Linux kernel panic record and an operating system (OS) bug check/blue screen event record.

5. A method for capturing a screenshot during an information handling system (IHS) failure, the method comprising:

detecting, via a controller, an occurrence of a system event log (SEL) incident in the IHS, in response to detecting the occurrence of the SEL incident in the IHS, retrieving a data recording window from a volatile controller memory, the data recording window containing video data and serial data recorded for a time period from prior to and up to a time of detection of the SEL incident;

determining if the data recording window is full;

in response to determining that the data recording window is full, erasing video data and serial data for the oldest time interval in the data recording window from the volatile controller memory; and storing, to the volatile controller memory, recent video data and serial data for a first time interval within the data recording window; and storing the data recording window including the video data and the serial data for the time period to a non-volatile controller memory.

6. The method of claim 5, further comprising:

in response to determining that the data recording window does not contain data for the maximum number of time intervals, storing the video data and the serial data for the first time interval in the data recording window to the volatile controller memory.

7. An information handling system (IHS) comprising:

a processor communicatively coupled to a controller, the controller communicatively coupled to a volatile controller memory and a non-volatile controller memory;

the controller having firmware executing thereon that enables the controller to capture a screenshot during a failure of the IHS, wherein the firmware configures the controller to:

detect an occurrence of a system event log (SEL) incident in the IHS, wherein the SEL incident comprises an intelligent platform management interface (IPMI) SEL addition command;

in response to detecting the occurrence of the SEL incident in the IHS, retrieve a data recording window from the volatile controller memory, the data recording window containing video data and serial data recorded for a time period from prior to and up to a time of detection of the SEL incident; and store the data recording window including the video data and the serial data for the time period to the non-volatile controller memory.

8. The information handling system of claim 7, wherein the IHS further comprises:

a graphics controller communicatively coupled to the controller; and a platform controller hub communicatively coupled to the controller;

wherein the firmware further configures the controller to:

trigger the graphics controller to transmit, to the controller, video data contained in at least one frame buffer for a first time interval, the time period including a plurality of time intervals;

trigger the platform controller hub (PCH) to transmit, to the controller, serial data contained in at least one serial buffer for the first time interval; and receive the video data and the serial data for the first time interval.

9. The information handling system of claim 8, wherein the firmware further configures the controller to:

in response to determining that the data recording window does not contain data for the maximum number of time intervals, store the video data and the serial data for the first time interval in the data recording window to the volatile controller memory.

10. The information handling system of claim 7, wherein the firmware further configures the controller to:

retrieve the data recording window from the volatile controller memory;

determine if the data recording window is full;

in response to determining that the data recording window is full, erase video data and serial data for the oldest time interval in the data recording window from the volatile controller memory; and store, to the volatile controller memory, recent video data and serial data for a first time interval within the data recording window.

11. The information handling system of claim 7, wherein the video data corresponds to a screenshot of a display.

12. The information handling system of claim 7, wherein a SEL includes at least one of a Linux kernel panic record and an operating system (OS) bug check/blue screen event record.

13. A system for capturing a screenshot during failure of an information handling system (IHS), the system comprising:

a processor communicatively coupled to a controller, the controller communicatively coupled to a volatile controller memory and a non-volatile controller memory;

the controller having firmware executing thereon for capturing the screenshot during failure of the IHS, wherein the firmware configures the controller to:

detect an occurrence of a system event log (SEL) incident in the IHS, wherein the SEL incident comprises an intelligent platform management interface (IPMI) SEL addition command;

in response to detecting the occurrence of the SEL incident in the IHS, retrieve a data recording window from the volatile controller memory, the data recording window containing video data and serial data recorded for a time period from prior to and up to a time of detection of the SEL incident; and store the data recording window including the video data and the serial data for the time period to the non-volatile controller memory.

14. The system of claim 13, wherein the system further comprises:
- a graphics controller communicatively coupled to the controller; and
- a platform controller hub communicatively coupled to the controller;
- wherein the firmware further configures the controller to:
  - trigger the graphics controller to transmit, to the controller, video data contained in at least one frame buffer for a first time interval, the time period including a plurality of time intervals;
  - trigger the platform controller hub (PCH) to transmit, to the controller, serial data contained in at least one serial buffer for the first time interval; and
  - receive the video data and the serial data for the first time interval.

15. The system of claim 14, wherein the firmware further configures the controller to:
- in response to determining that the data recording window does not contain data for the maximum number of time intervals, store the video data and the serial data for the first time interval in the data recording window to the volatile controller memory.

16. The system of claim 13, wherein the firmware further configures the controller to:
- retrieve the data recording window from the volatile controller memory;
- determine if the data recording window is full;
- in response to determining that the data recording window is full, erase video data and serial data for the oldest time interval in the data recording window from the volatile controller memory; and
- store, to the volatile controller memory, recent video data and serial data for a first time interval within the data recording window.

17. The system of claim 13, wherein the video data corresponds to a screenshot of a display.

* * * * *